United States Patent
Staniforth et al.

(10) Patent No.: US 9,335,064 B2
(45) Date of Patent: *May 10, 2016

(54) FAN ASSEMBLY

(71) Applicant: Dyson Technology Limited, Wiltshire (GB)

(72) Inventors: Mark Joseph Staniforth, Bristol (GB); Jude Paul Pullen, London (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,122

(22) Filed: Aug. 3, 2015

(65) Prior Publication Data

US 2015/0338113 A1 Nov. 26, 2015

Related U.S. Application Data

(63) Continuation of application No. 13/559,145, filed on Jul. 26, 2012, now Pat. No. 9,127,855.

(30) Foreign Application Priority Data

| Jul. 27, 2011 | (GB) | ................................ 1112911.1 |
| Mar. 6, 2012 | (GB) | ................................ 1203887.3 |
| Mar. 6, 2012 | (GB) | ................................ 1203888.1 |

(51) Int. Cl.
*F24F 6/14* (2006.01)
*F24F 13/26* (2006.01)
(Continued)

(52) U.S. Cl.
CPC ............. *F24F 13/26* (2013.01); *F04D 25/08* (2013.01); *F04D 29/705* (2013.01); *F04F 5/16* (2013.01);
(Continued)

(58) Field of Classification Search
CPC ....... B01F 3/04; B01F 3/0407; B01F 3/04021
USPC ........................................... 261/116, 81, 133
See application file for complete search history.

(56) References Cited

U.S. PATENT DOCUMENTS

| 284,962 A | 9/1883 | Huston |
| 1,357,261 A | 11/1920 | Svoboda |

(Continued)

FOREIGN PATENT DOCUMENTS

| BE | 560119 | 8/1957 |
| CA | 1055344 | 5/1979 |

(Continued)

OTHER PUBLICATIONS

Search Report dated Oct. 13, 2011, directed to GB Application No. 1112911.1; 2 pages.

(Continued)

*Primary Examiner* — Duane Smith
*Assistant Examiner* — Adam W Bergfelder
(74) *Attorney, Agent, or Firm* — Morrison & Foerster LLP (57) ABSTRACT

A fan assembly includes a nozzle and a body on which the nozzle is mounted. The nozzle has a first air inlet, a first air outlet, and a first interior passage for conveying air from the first air inlet to the first air outlet. The nozzle also includes a second air inlet, a plurality of second air outlets, and a second interior passage for conveying air from the second air inlet to the second air outlets. The body generates a first air flow through the first interior passage and a second air flow through the second interior passage. A first air passageway conveys the first air flow to the first air inlet and a second air passageway conveys the second air flow to the second air inlet. One of the temperature, humidity, composition and electrical charge of the second air flow is changed before it is emitted from the nozzle.

7 Claims, 8 Drawing Sheets

(51) Int. Cl.
  *F04D 25/08* (2006.01)
  *F04F 5/16* (2006.01)
  *F24F 1/01* (2011.01)
  *F04D 29/70* (2006.01)
  *F24F 6/00* (2006.01)
  *F24F 6/12* (2006.01)

(52) U.S. Cl.
  CPC ... *F24F 1/01* (2013.01); *F24F 6/14* (2013.01); *F24F 2006/008* (2013.01); *F24F 2006/125* (2012.12); *F24F 2221/28* (2013.01); *Y02B 30/545* (2013.01); *Y02B 30/80* (2013.01)

(56) References Cited

U.S. PATENT DOCUMENTS

| | | |
|---|---|---|
| 1,767,060 A | 6/1930 | Ferguson |
| 1,896,869 A | 2/1933 | Larsh |
| 2,014,185 A | 9/1935 | Martin |
| 2,035,733 A | 3/1936 | Wall |
| 2,071,266 A | 2/1937 | Schmidt |
| D103,476 S | 3/1937 | Weber |
| 2,115,883 A | 5/1938 | Sher |
| D115,344 S | 6/1939 | Chapman |
| 2,210,458 A | 8/1940 | Keilholtz |
| 2,258,961 A | 10/1941 | Saathoff |
| 2,295,502 A | 9/1942 | Lamb |
| 2,336,295 A | 12/1943 | Reimuller |
| 2,363,839 A | 11/1944 | Demuth |
| 2,433,795 A | 12/1947 | Stokes |
| 2,473,325 A | 6/1949 | Aufiero |
| 2,476,002 A | 7/1949 | Stalker |
| 2,488,467 A | 11/1949 | De Lisio |
| 2,510,132 A | 6/1950 | Morrison |
| 2,544,379 A | 3/1951 | Davenport |
| 2,547,448 A | 4/1951 | Demuth |
| 2,583,374 A | 1/1952 | Hoffman |
| 2,620,127 A | 12/1952 | Radcliffe |
| 2,711,682 A | 6/1955 | Drechsel |
| 2,765,977 A | 10/1956 | Morrison |
| 2,808,198 A | 10/1957 | Morrison |
| 2,813,673 A | 11/1957 | Smith |
| 2,830,779 A | 4/1958 | Wentling |
| 2,838,229 A | 6/1958 | Belanger |
| 2,922,277 A | 1/1960 | Bertin |
| 2,922,570 A | 1/1960 | Allen |
| 3,004,403 A | 10/1961 | Laporte |
| 3,047,208 A | 7/1962 | Coanda |
| 3,185,448 A | 5/1965 | Fraser et al. |
| 3,270,655 A | 9/1966 | Guirl et al. |
| D206,973 S | 2/1967 | De Lisio |
| 3,503,138 A | 3/1970 | Fuchs et al. |
| 3,518,776 A | 7/1970 | Wolff et al. |
| 3,724,092 A | 4/1973 | McCleerey |
| 3,729,934 A | 5/1973 | Denning et al. |
| 3,743,186 A | 7/1973 | Mocarski |
| 3,795,367 A | 3/1974 | Mocarski |
| 3,872,916 A | 3/1975 | Beck |
| 3,875,745 A | 4/1975 | Franklin |
| 3,885,891 A | 5/1975 | Throndson |
| 3,943,329 A | 3/1976 | Hlavac |
| 4,037,991 A | 7/1977 | Taylor |
| 4,046,492 A | 9/1977 | Inglis |
| 4,061,188 A | 12/1977 | Beck |
| 4,073,613 A | 2/1978 | Desty |
| 4,090,814 A | 5/1978 | Teodorescu et al. |
| 4,113,416 A | 9/1978 | Kataoka et al. |
| 4,136,735 A | 1/1979 | Beck et al. |
| 4,173,995 A | 11/1979 | Beck |
| 4,180,130 A | 12/1979 | Beck et al. |
| 4,184,417 A | 1/1980 | Chancellor |
| 4,184,541 A | 1/1980 | Beck et al. |
| 4,192,461 A | 3/1980 | Arborg |
| 4,221,331 A | 9/1980 | Goran, Jr. |
| 4,332,529 A | 6/1982 | Alperin |
| 4,336,017 A | 6/1982 | Desty |
| 4,342,204 A | 8/1982 | Melikian et al. |
| 4,448,354 A | 5/1984 | Reznick et al. |
| 4,568,243 A | 2/1986 | Schubert et al. |
| 4,630,475 A | 12/1986 | Mizoguchi |
| 4,634,050 A | 1/1987 | Shippee |
| 4,643,351 A | 2/1987 | Fukamachi et al. |
| 4,703,152 A | 10/1987 | Shih-Chin |
| 4,716,946 A | 1/1988 | Grigoletto |
| 4,718,870 A | 1/1988 | Watts |
| 4,732,539 A | 3/1988 | Shin-Chin |
| 4,734,017 A | 3/1988 | Levin |
| 4,790,133 A | 12/1988 | Stuart |
| 4,850,804 A | 7/1989 | Huang |
| 4,878,620 A | 11/1989 | Tarleton |
| 4,893,990 A | 1/1990 | Tomohiro et al. |
| 4,978,281 A | 12/1990 | Conger |
| 5,061,405 A | 10/1991 | Stanek et al. |
| D325,435 S | 4/1992 | Coup et al. |
| 5,110,266 A | 5/1992 | Toyoshima et al. |
| 5,168,722 A | 12/1992 | Brock |
| 5,176,856 A | 1/1993 | Takahashi et al. |
| 5,188,508 A | 2/1993 | Scott et al. |
| 5,296,769 A | 3/1994 | Havens et al. |
| 5,310,313 A | 5/1994 | Chen |
| 5,317,815 A | 6/1994 | Hwang |
| 5,322,218 A | 6/1994 | Melbourne |
| 5,338,495 A | 8/1994 | Steiner et al. |
| 5,402,938 A | 4/1995 | Sweeney |
| 5,407,324 A | 4/1995 | Starnes, Jr. et al. |
| 5,425,902 A | 6/1995 | Miller et al. |
| 5,435,489 A | 7/1995 | Jenkins et al. |
| 5,483,616 A | 1/1996 | Chiu et al. |
| 5,518,370 A | 5/1996 | Wang et al. |
| 5,609,473 A | 3/1997 | Litvin |
| 5,645,769 A | 7/1997 | Tamaru et al. |
| 5,649,370 A | 7/1997 | Russo |
| 5,671,321 A | 9/1997 | Bagnuolo |
| 5,677,982 A | 10/1997 | Levine et al. |
| 5,735,683 A | 4/1998 | Muschelknautz |
| 5,762,034 A | 6/1998 | Foss |
| 5,762,661 A | 6/1998 | Kleinberger et al. |
| 5,783,117 A | 7/1998 | Byassee et al. |
| 5,794,306 A | 8/1998 | Firdaus |
| D398,983 S | 9/1998 | Keller et al. |
| 5,841,080 A | 11/1998 | Iida et al. |
| 5,843,344 A | 12/1998 | Junket et al. |
| 5,859,952 A | 1/1999 | Levine et al. |
| 5,862,037 A | 1/1999 | Behl |
| 5,868,197 A | 2/1999 | Potier |
| 5,881,685 A | 3/1999 | Foss et al. |
| D415,271 S | 10/1999 | Feer |
| 6,015,274 A | 1/2000 | Bias et al. |
| 6,073,881 A | 6/2000 | Chen |
| D429,808 S | 8/2000 | Krauss et al. |
| 6,123,618 A | 9/2000 | Day |
| 6,155,782 A | 12/2000 | Hsu |
| D435,899 S | 1/2001 | Melwani |
| 6,254,337 B1 | 7/2001 | Arnold |
| 6,269,549 B1 | 8/2001 | Carlucci et al. |
| 6,278,248 B1 | 8/2001 | Hong et al. |
| 6,282,746 B1 | 9/2001 | Schleeter |
| 6,293,121 B1 | 9/2001 | Labrador |
| 6,321,034 B2 | 11/2001 | Jones-Lawlor et al. |
| 6,386,845 B1 | 5/2002 | Bedard |
| 6,480,672 B1 | 11/2002 | Rosenzweig et al. |
| 6,599,088 B2 | 7/2003 | Stagg |
| 6,604,694 B1 | 8/2003 | Kordas et al. |
| D485,895 S | 1/2004 | Melwani |
| 6,789,787 B2 | 9/2004 | Stutts |
| 6,791,056 B2 | 9/2004 | VanOtteren et al. |
| 6,830,433 B2 | 12/2004 | Birdsell et al. |
| 6,845,971 B2 | 1/2005 | Bachert |
| 7,059,826 B2 | 6/2006 | Lasko |
| 7,088,913 B1 | 8/2006 | Verhoorn et al. |
| 7,147,336 B1 | 12/2006 | Chou |
| D539,414 S | 3/2007 | Russak et al. |
| 7,192,258 B2 | 3/2007 | Kuo et al. |
| 7,198,473 B2 | 4/2007 | Stickland et al. |

(56) References Cited

U.S. PATENT DOCUMENTS

| | | |
|---|---|---|
| 7,412,781 B2 | 8/2008 | Mattinger et al. |
| 7,478,993 B2 | 1/2009 | Hong et al. |
| 7,540,474 B1 | 6/2009 | Huang et al. |
| D598,532 S | 8/2009 | Dyson et al. |
| D602,143 S | 10/2009 | Gammack et al. |
| D602,144 S | 10/2009 | Dyson et al. |
| D605,748 S | 12/2009 | Gammack et al. |
| 7,660,110 B2 | 2/2010 | Vinson et al. |
| 7,664,377 B2 | 2/2010 | Liao |
| D614,280 S | 4/2010 | Dyson et al. |
| 7,731,050 B2 | 6/2010 | Parks et al. |
| 7,775,848 B1 | 8/2010 | Auerbach |
| 7,806,388 B2 | 10/2010 | Junkel et al. |
| 7,841,045 B2 | 11/2010 | Shaanan et al. |
| 7,931,449 B2 | 4/2011 | Fitton et al. |
| 8,002,520 B2 | 8/2011 | Dawson et al. |
| 8,092,166 B2 | 1/2012 | Nicolas et al. |
| 8,113,490 B2 | 2/2012 | Chen |
| 8,152,495 B2 | 4/2012 | Boggess, Jr. et al. |
| 8,246,317 B2 | 8/2012 | Gammack |
| 8,308,445 B2 | 11/2012 | Gammack et al. |
| 8,348,629 B2 | 1/2013 | Fitton et al. |
| 8,356,804 B2 | 1/2013 | Fitton et al. |
| 8,454,322 B2 | 6/2013 | Gammack et al. |
| 8,529,226 B2 | 9/2013 | Li |
| 8,544,826 B2 | 10/2013 | Ediger et al. |
| 8,721,307 B2 | 5/2014 | Li |
| 2002/0104972 A1 | 8/2002 | Guzorek |
| 2002/0106547 A1 | 8/2002 | Sugawara et al. |
| 2003/0059307 A1 | 3/2003 | Moreno et al. |
| 2003/0164367 A1 | 9/2003 | Bucher et al. |
| 2003/0171093 A1 | 9/2003 | Gumucio Del Pozo |
| 2003/0190183 A1 | 10/2003 | Hsing |
| 2004/0022631 A1 | 2/2004 | Birdsell et al. |
| 2004/0049842 A1 | 3/2004 | Prehodka |
| 2004/0106370 A1 | 6/2004 | Honda et al. |
| 2004/0149881 A1 | 8/2004 | Allen |
| 2005/0031448 A1 | 2/2005 | Lasko et al. |
| 2005/0053465 A1 | 3/2005 | Roach et al. |
| 2005/0069407 A1 | 3/2005 | Winkler et al. |
| 2005/0128698 A1 | 6/2005 | Huang |
| 2005/0163670 A1 | 7/2005 | Alleyne et al. |
| 2005/0173997 A1 | 8/2005 | Schmid et al. |
| 2005/0281672 A1 | 12/2005 | Parker et al. |
| 2006/0172682 A1 | 8/2006 | Orr et al. |
| 2006/0199515 A1 | 9/2006 | Lasko et al. |
| 2006/0263073 A1 | 11/2006 | Clarke et al. |
| 2006/0279927 A1 | 12/2006 | Strohm |
| 2007/0035189 A1 | 2/2007 | Matsumoto |
| 2007/0041857 A1 | 2/2007 | Fleig |
| 2007/0065280 A1 | 3/2007 | Fok |
| 2007/0166160 A1 | 7/2007 | Russak et al. |
| 2007/0176502 A1 | 8/2007 | Kasai et al. |
| 2007/0224044 A1 | 9/2007 | Hong et al. |
| 2007/0237500 A1 | 10/2007 | Wang |
| 2007/0269323 A1 | 11/2007 | Zhou et al. |
| 2008/0020698 A1 | 1/2008 | Spaggiari |
| 2008/0124060 A1 | 5/2008 | Gao |
| 2008/0152482 A1 | 6/2008 | Patel |
| 2008/0166224 A1 | 7/2008 | Giffin |
| 2008/0286130 A1 | 11/2008 | Purvines |
| 2008/0314250 A1 | 12/2008 | Cowie et al. |
| 2009/0026850 A1 | 1/2009 | Fu |
| 2009/0032130 A1 | 2/2009 | Dumas et al. |
| 2009/0039805 A1 | 2/2009 | Tang |
| 2009/0060710 A1 | 3/2009 | Gammack et al. |
| 2009/0060711 A1 | 3/2009 | Gammack et al. |
| 2009/0078120 A1 | 3/2009 | Kummer et al. |
| 2009/0120925 A1 | 5/2009 | Lasko |
| 2009/0191054 A1 | 7/2009 | Winkler |
| 2009/0214341 A1 | 8/2009 | Craig |
| 2010/0133707 A1 | 6/2010 | Huang |
| 2010/0150699 A1 | 6/2010 | Nicolas et al. |
| 2010/0162011 A1 | 6/2010 | Min |
| 2010/0171465 A1 | 7/2010 | Seal et al. |
| 2010/0225012 A1* | 9/2010 | Fitton .................. F24F 1/01 261/116 |
| 2010/0226749 A1 | 9/2010 | Gammack et al. |
| 2010/0226750 A1 | 9/2010 | Gammack |
| 2010/0226751 A1 | 9/2010 | Gammack et al. |
| 2010/0226752 A1 | 9/2010 | Gammack et al. |
| 2010/0226753 A1 | 9/2010 | Dyson et al. |
| 2010/0226754 A1 | 9/2010 | Hutton et al. |
| 2010/0226758 A1 | 9/2010 | Cookson et al. |
| 2010/0226763 A1 | 9/2010 | Gammack et al. |
| 2010/0226764 A1 | 9/2010 | Gammack et al. |
| 2010/0226769 A1 | 9/2010 | Helps |
| 2010/0226771 A1 | 9/2010 | Crawford et al. |
| 2010/0226787 A1 | 9/2010 | Gammack et al. |
| 2010/0226797 A1 | 9/2010 | Fitton et al. |
| 2010/0226801 A1 | 9/2010 | Gammack |
| 2010/0254800 A1 | 10/2010 | Fitton et al. |
| 2011/0058935 A1 | 3/2011 | Gammack et al. |
| 2011/0110805 A1 | 5/2011 | Gammack et al. |
| 2011/0164959 A1 | 7/2011 | Fitton et al. |
| 2011/0223014 A1 | 9/2011 | Crawford et al. |
| 2011/0223015 A1 | 9/2011 | Gammack et al. |
| 2011/0259980 A1 | 10/2011 | Akisada et al. |
| 2012/0031509 A1 | 2/2012 | Wallace et al. |
| 2012/0033952 A1 | 2/2012 | Wallace et al. |
| 2012/0034108 A1 | 2/2012 | Wallace et al. |
| 2012/0039705 A1 | 2/2012 | Gammack |
| 2012/0045315 A1 | 2/2012 | Gammack |
| 2012/0045316 A1 | 2/2012 | Gammack |
| 2012/0057959 A1 | 3/2012 | Hodgson et al. |
| 2012/0082561 A1 | 4/2012 | Gammack et al. |
| 2012/0093629 A1 | 4/2012 | Fitton et al. |
| 2012/0093630 A1 | 4/2012 | Fitton et al. |
| 2012/0114513 A1 | 5/2012 | Simmonds et al. |
| 2012/0230658 A1 | 9/2012 | Fitton et al. |
| 2012/0308375 A1 | 12/2012 | Gammack |
| 2013/0028763 A1 | 1/2013 | Staniforth et al. |
| 2013/0028766 A1 | 1/2013 | Staniforth et al. |
| 2013/0129490 A1 | 5/2013 | Dos Reis et al. |
| 2013/0161842 A1 | 6/2013 | Fitton et al. |
| 2013/0199372 A1 | 8/2013 | Nock et al. |
| 2013/0234346 A1 | 9/2013 | Staniforth et al. |
| 2013/0234347 A1 | 9/2013 | Staniforth et al. |
| 2013/0249122 A1 | 9/2013 | Staniforth et al. |
| 2013/0249124 A1 | 9/2013 | Staniforth et al. |
| 2013/0249126 A1 | 9/2013 | Staniforth et al. |
| 2013/0272858 A1 | 10/2013 | Stickney et al. |
| 2013/0280051 A1 | 10/2013 | Nicolas et al. |
| 2013/0280061 A1 | 10/2013 | Stickney |
| 2013/0280096 A1 | 10/2013 | Gammack et al. |
| 2013/0323100 A1 | 12/2013 | Poulton et al. |
| 2014/0077398 A1 | 3/2014 | Staniforth et al. |
| 2014/0079566 A1 | 3/2014 | Gammack et al. |
| 2014/0084492 A1 | 3/2014 | Staniforth et al. |
| 2014/0210114 A1 | 7/2014 | Staniforth et al. |
| 2014/0210115 A1 | 7/2014 | Staniforth et al. |
| 2014/0255173 A1 | 9/2014 | Poulton et al. |
| 2014/0255217 A1 | 9/2014 | Li |

FOREIGN PATENT DOCUMENTS

| | | |
|---|---|---|
| CA | 2155482 | 9/1996 |
| CH | 346643 | 5/1960 |
| CN | 2085866 | 10/1991 |
| CN | 2111392 | 7/1992 |
| CN | 2549372 | 5/2003 |
| CN | 1437300 | 8/2003 |
| CN | 2650005 | 10/2004 |
| CN | 2713643 | 7/2005 |
| CN | 1680727 | 10/2005 |
| CN | 2833197 | 11/2006 |
| CN | 201011346 | 1/2008 |
| CN | 201147215 | 11/2008 |
| CN | 201180678 | 1/2009 |
| CN | 201221477 | 4/2009 |
| CN | 101424279 | 5/2009 |
| CN | 101451754 | 6/2009 |
| CN | 201281416 | 7/2009 |
| CN | 201349269 | 11/2009 |

(56) References Cited

FOREIGN PATENT DOCUMENTS

| | | |
|---|---|---|
| CN | 101684828 | 3/2010 |
| CN | 201486901 | 5/2010 |
| CN | 101749288 | 6/2010 |
| CN | 201502549 | 6/2010 |
| CN | 201507461 | 6/2010 |
| CN | 101825096 | 9/2010 |
| CN | 101825101 | 9/2010 |
| CN | 101825102 | 9/2010 |
| CN | 101825103 | 9/2010 |
| CN | 101825104 | 9/2010 |
| CN | 201568337 | 9/2010 |
| CN | 101858355 | 10/2010 |
| CN | 101936310 | 1/2011 |
| CN | 201696365 | 1/2011 |
| CN | 201696366 | 1/2011 |
| CN | 201739199 | 2/2011 |
| CN | 101984299 | 3/2011 |
| CN | 101985948 | 3/2011 |
| CN | 201763705 | 3/2011 |
| CN | 201763706 | 3/2011 |
| CN | 201770513 | 3/2011 |
| CN | 201771875 | 3/2011 |
| CN | 201779080 | 3/2011 |
| CN | 201786777 | 4/2011 |
| CN | 201786778 | 4/2011 |
| CN | 201802648 | 4/2011 |
| CN | 102095236 | 6/2011 |
| CN | 201858204 | 6/2011 |
| CN | 201874898 | 6/2011 |
| CN | 201874901 | 6/2011 |
| CN | 201917047 | 8/2011 |
| CN | 102251973 | 11/2011 |
| CN | 102287357 | 12/2011 |
| CN | 102367813 | 3/2012 |
| CN | 202267207 | 6/2012 |
| CN | 202431623 | 9/2012 |
| DE | 1 291 090 | 3/1969 |
| DE | 24 51 557 | 5/1976 |
| DE | 27 48 724 | 5/1978 |
| DE | 3644567 | 7/1988 |
| DE | 195 10 397 | 9/1996 |
| DE | 197 12 228 | 10/1998 |
| DE | 100 00 400 | 3/2001 |
| DE | 10041805 | 6/2002 |
| DE | 10 2009 007 037 | 8/2010 |
| EP | 0 044 494 | 1/1982 |
| EP | 0 186 581 | 7/1986 |
| EP | 0 459 812 | 12/1991 |
| EP | 0 784 947 | 7/1997 |
| EP | 1 094 224 | 4/2001 |
| EP | 1 138 954 | 10/2001 |
| EP | 1 357 296 | 10/2003 |
| EP | 1 779 745 | 5/2007 |
| EP | 1 939 456 | 7/2008 |
| EP | 1 980 432 | 10/2008 |
| EP | 2 000 675 | 12/2008 |
| EP | 2191142 | 6/2010 |
| EP | 2 414 738 | 2/2012 |
| EP | 2 578 889 | 4/2013 |
| FR | 1033034 | 7/1953 |
| FR | 1119439 | 6/1956 |
| FR | 1.387.334 | 1/1965 |
| FR | 2 375 471 | 7/1978 |
| FR | 2 534 983 | 4/1984 |
| FR | 2 640 857 | 6/1990 |
| FR | 2 658 593 | 8/1991 |
| FR | 2794195 | 12/2000 |
| FR | 2 874 409 | 2/2006 |
| FR | 2 906 980 | 4/2008 |
| FR | 2928706 | 9/2009 |
| GB | 22235 | 6/1914 |
| GB | 383498 | 11/1932 |
| GB | 593828 | 10/1947 |
| GB | 601222 | 4/1948 |
| GB | 633273 | 12/1949 |
| GB | 641622 | 8/1950 |
| GB | 661747 | 11/1951 |
| GB | 863 124 | 3/1961 |
| GB | 1067956 | 5/1967 |
| GB | 1 262 131 | 2/1972 |
| GB | 1 265 341 | 3/1972 |
| GB | 1 278 606 | 6/1972 |
| GB | 1 304 560 | 1/1973 |
| GB | 1 403 188 | 8/1975 |
| GB | 1 434 226 | 5/1976 |
| GB | 1 501 473 | 2/1978 |
| GB | 2 094 400 | 9/1982 |
| GB | 2 107 787 | 5/1983 |
| GB | 2 111 125 | 6/1983 |
| GB | 2 178 256 | 2/1987 |
| GB | 2 185 531 | 7/1987 |
| GB | 2 185 533 | 7/1987 |
| GB | 2 218 196 | 11/1989 |
| GB | 2 236 804 | 4/1991 |
| GB | 2 240 268 | 7/1991 |
| GB | 2 242 935 | 10/1991 |
| GB | 2 285 504 | 7/1995 |
| GB | 2 289 087 | 11/1995 |
| GB | 2383277 | 6/2003 |
| GB | 2 428 569 | 2/2007 |
| GB | 2 452 593 | 3/2009 |
| GB | 2452490 | 3/2009 |
| GB | 2463698 | 3/2010 |
| GB | 2464736 | 4/2010 |
| GB | 2466058 | 6/2010 |
| GB | 2468312 | 9/2010 |
| GB | 2468313 | 9/2010 |
| GB | 2468315 | 9/2010 |
| GB | 2468317 | 9/2010 |
| GB | 2468319 | 9/2010 |
| GB | 2468320 | 9/2010 |
| GB | 2468323 | 9/2010 |
| GB | 2468328 | 9/2010 |
| GB | 2468329 | 9/2010 |
| GB | 2468331 | 9/2010 |
| GB | 2468369 | 9/2010 |
| GB | 2468498 | 9/2010 |
| GB | 2473037 | 3/2011 |
| GB | 2479760 | 10/2011 |
| GB | 2482547 | 2/2012 |
| GB | 2484671 | 4/2012 |
| GB | 2484695 | 4/2012 |
| GB | 2484761 | 4/2012 |
| GB | 2493231 | 1/2013 |
| GB | 2493505 | 2/2013 |
| GB | 2493507 | 2/2013 |
| GB | 2500011 | 9/2013 |
| JP | 31-13055 | 8/1956 |
| JP | 35-4369 | 3/1960 |
| JP | 39-7297 | 3/1964 |
| JP | 46-7230 | 12/1971 |
| JP | 47-21718 | 10/1972 |
| JP | 49-43764 | 4/1974 |
| JP | 49-150403 | 12/1974 |
| JP | 51-7258 | 1/1976 |
| JP | 52-121045 | 9/1977 |
| JP | 53-60100 | 5/1978 |
| JP | 56-167897 | 12/1981 |
| JP | 57-71000 | 5/1982 |
| JP | 57-157097 | 9/1982 |
| JP | 61-31830 | 2/1986 |
| JP | 61-116093 | 6/1986 |
| JP | 61-280787 | 12/1986 |
| JP | 62-98099 | 5/1987 |
| JP | 62-223494 | 10/1987 |
| JP | 63-36794 | 3/1988 |
| JP | 63-179198 | 7/1988 |
| JP | 63-198933 | 12/1988 |
| JP | 63-306340 | 12/1988 |
| JP | 64-21300 | 2/1989 |
| JP | 64-58955 | 3/1989 |
| JP | 64-83884 | 3/1989 |
| JP | 1-138399 | 5/1989 |
| JP | 1-224598 | 9/1989 |

(56) References Cited

FOREIGN PATENT DOCUMENTS

| | | |
|---|---|---|
| JP | 2-146294 | 6/1990 |
| JP | 2-218890 | 8/1990 |
| JP | 2-248690 | 10/1990 |
| JP | 3-52515 | 5/1991 |
| JP | 3-267598 | 11/1991 |
| JP | 3-286775 | 12/1991 |
| JP | 4-43895 | 2/1992 |
| JP | 4-366330 | 12/1992 |
| JP | 5-99386 | 4/1993 |
| JP | 5-157093 | 6/1993 |
| JP | 5-164089 | 6/1993 |
| JP | 5-263786 | 10/1993 |
| JP | 6-74190 | 3/1994 |
| JP | 6-86898 | 3/1994 |
| JP | 6-147188 | 5/1994 |
| JP | 6-257591 | 9/1994 |
| JP | 6-280800 | 10/1994 |
| JP | 6-336113 | 12/1994 |
| JP | 7-190443 | 7/1995 |
| JP | 8-21400 | 1/1996 |
| JP | 8-72525 | 3/1996 |
| JP | 8-313019 | 11/1996 |
| JP | 9-86154 | 3/1997 |
| JP | 9-100800 | 4/1997 |
| JP | 9-178083 | 7/1997 |
| JP | 9-287600 | 11/1997 |
| JP | 11-502586 | 3/1999 |
| JP | 11-227866 | 8/1999 |
| JP | 2000-55419 | 2/2000 |
| JP | 2000-116179 | 4/2000 |
| JP | 2000-201723 | 7/2000 |
| JP | 2001-17358 | 1/2001 |
| JP | 2002-21797 | 1/2002 |
| JP | 2002-138829 | 5/2002 |
| JP | 2002-213388 | 7/2002 |
| JP | 2003-4265 | 1/2003 |
| JP | 2003-329273 | 11/2003 |
| JP | 2004-8275 | 1/2004 |
| JP | 2004-208935 | 7/2004 |
| JP | 2004-216221 | 8/2004 |
| JP | 2005-201507 | 7/2005 |
| JP | 2005-307985 | 11/2005 |
| JP | 2006-89096 | 4/2006 |
| JP | 2006-189221 | 7/2006 |
| JP | 3127331 | 11/2006 |
| JP | 3129024 | 2/2007 |
| JP | 2007-138763 | 6/2007 |
| JP | 2007-138789 | 6/2007 |
| JP | 2008-37247 | 2/2008 |
| JP | 2008-39316 | 2/2008 |
| JP | 2008-100204 | 5/2008 |
| JP | 3144127 | 8/2008 |
| JP | 3146538 | 10/2008 |
| JP | 2008-294243 | 12/2008 |
| JP | 2009-41835 | 2/2009 |
| JP | 2009-44568 | 2/2009 |
| JP | 2009-62986 | 3/2009 |
| JP | 2009-275925 | 11/2009 |
| JP | 2010-46411 | 3/2010 |
| JP | 2010-131259 | 6/2010 |
| JP | 2010-203760 | 9/2010 |
| JP | 2010-203764 | 9/2010 |
| JP | 2012-31806 | 2/2012 |
| KR | 1999-002660 | 1/1999 |
| KR | 10-2005-0102317 | 10/2005 |
| KR | 10-2007-0007997 | 1/2007 |
| KR | 20-0448319 | 3/2010 |
| KR | 10-2010-0055611 | 5/2010 |
| KR | 10-0985378 | 9/2010 |
| TW | 517825 | 1/2003 |
| TW | 589932 | 6/2004 |
| TW | M331585 | 5/2008 |
| TW | M394383 | 12/2010 |
| TW | M399207 | 3/2011 |
| TW | M407299 | 7/2011 |
| WO | WO-90/13478 | 11/1990 |
| WO | WO-95/06822 | 3/1995 |
| WO | WO-02/073096 | 9/2002 |
| WO | WO-03/058795 | 7/2003 |
| WO | WO-03/069931 | 8/2003 |
| WO | WO-2005/050026 | 6/2005 |
| WO | WO-2005/057091 | 6/2005 |
| WO | WO-2006/008021 | 1/2006 |
| WO | WO-2006/012526 | 2/2006 |
| WO | WO-2007/024955 | 3/2007 |
| WO | WO-2007/048205 | 5/2007 |
| WO | WO-2008/014641 | 2/2008 |
| WO | WO-2008/024569 | 2/2008 |
| WO | WO-2008/139491 | 11/2008 |
| WO | WO-2009/030879 | 3/2009 |
| WO | WO-2009/030881 | 3/2009 |
| WO | WO-2010/100449 | 9/2010 |
| WO | WO-2010/100451 | 9/2010 |
| WO | WO-2010/100452 | 9/2010 |
| WO | WO-2010/100453 | 9/2010 |
| WO | WO-2010/100462 | 9/2010 |
| WO | WO-2011/050041 | 4/2011 |
| WO | WO-2011/147318 | 12/2011 |
| WO | WO-2012/006882 | 1/2012 |
| WO | WO-2012/033517 | 3/2012 |
| WO | WO-2012/052737 | 4/2012 |
| WO | WO-2013/014419 | 1/2013 |
| WO | WO-2013/132218 | 9/2013 |

OTHER PUBLICATIONS

Search Report dated Jun. 25, 2012, directed to GB Application No. 1203887.3; 1 page.

Search Report dated Jul. 2, 2012, directed to GB Application No. 1203888.1; 2 pages.

International Search Report and Written Opinion mailed Nov. 2, 2012, directed to International Application No. PCT/GB2012/051489; 10 pages.

Reba, I. (1966). "Applications of the Coanda Effect," *Scientific American* 214:84-92.

Third Party Submission Under 37 CFR 1.99 filed Jun. 2, 2011, directed to U.S. Appl. No. 12/203,698; 3 pages.

Gammack et al., U.S. Office Action mailed Dec. 9, 2010, directed to U.S. Appl. No. 12/203,698; 10 pages.

Gammack et al., U.S. Office Action mailed Jun. 21, 2011, directed to U.S. Appl. No. 12/203,698; 11 pages.

Gammack et al., U.S. Office Action mailed Sep. 17, 2012, directed to U.S. Appl. No. 13/114,707; 12 pages.

Gammack et al., U.S. Office Action mailed Dec. 10, 2010, directed to U.S. Appl. No. 12/230,613; 12 pages.

Gammack et al., U.S. Office Action mailed May 13, 2011, directed to U.S. Appl. No. 12/230,613; 13 pages.

Gammack et al., U.S. Office Action mailed Sep. 7, 2011, directed to U.S. Appl. No. 12/230,613; 15 pages.

Gammack et al., U.S. Office Action mailed Jun. 8, 2012, directed to U.S. Appl. No. 12/230,613; 15 pages.

Gammack et al., U.S. Office Action mailed Aug. 20, 2012, directed to U.S. Appl. No. 12/945,558; 15 pages.

Gammack et al., U.S. Office Action mailed Feb. 28, 2013, directed to U.S. Appl. No. 12/945,558; 16 pages.

Gammack et al., U.S. Office Action mailed Jun. 12, 2013, directed to U.S. Appl. No. 12/945,558; 20 pages.

Fitton et al., U.S. Office Action mailed Nov. 30, 2010 directed to U.S. Appl. No. 12/560,232; 9 pages.

Nicolas et al., U.S. Office Action mailed Mar. 7, 2011, directed to U.S. Appl. No. 12/622,844; 10 pages.

Nicolas et al., U.S. Office Action mailed Sep. 8, 2011, directed to U.S. Appl. No. 12/622,844; 11 pages.

Helps et al., U.S. Office Action mailed Feb. 15, 2013, directed to U.S. Appl. No. 12/716,694; 12 pages.

Gammack et al., U.S. Office Action mailed Dec. 9, 2010, directed to U.S. Appl. No. 12/716,781; 17 pages.

Gammack et al., U.S. Office Action mailed Jun. 24, 2011, directed to U.S. Appl. No. 12/716,781; 19 pages.

(56) References Cited

OTHER PUBLICATIONS

Gammack et al., U.S. Office Action mailed May 29, 2013, directed to U.S. Appl. No. 13/588,666; 11 pages.
Gammack et al., U.S. Office Action mailed Sep. 27, 2013, directed to U.S. Appl. No. 13/588,666; 10 pages.
Gammack et al., U.S. Office Action mailed Mar. 14, 2013, directed to U.S. Appl. No. 12/716,740; 15 pages.
Gammack et al., U.S. Office Action mailed Sep. 6, 2013, directed to U.S. Appl. No. 12/716,740; 15 pages.
Gammack et al., U.S. Office Action mailed Apr. 24, 2014, directed to U.S. Appl. No. 12/716,740; 16 pages.
Li, U.S. Office Action mailed Oct. 25, 2013, directed to U.S. Appl. No. 13/686,480; 17 pages.
Fitton et al., U.S. Office Action mailed Jun. 13, 2014, directed to U.S. Appl. No. 13/274,998; 11 pages.
Fitton et al., U.S. Office Action mailed Jun. 13, 2014, directed to U.S. Appl. No. 13/275,034; 10 pages.
Gammack et al., U.S. Office Action mailed Feb. 14, 2013, directed to U.S. Appl. No. 12/716,515; 21 pages.
Gammack et al., U.S. Office Action mailed Aug. 19, 2013, directed to U.S. Appl. No. 12/716,515; 20 pages.
Gammack et al., U.S. Office Action mailed Feb. 10, 2014, directed to U.S. Appl. No. 12/716,515; 21 pages.
Fitton et al., U.S. Office Action mailed Mar. 30, 2012, directed to U.S. Appl. No. 12/716,707; 7 pages.
Fitton et al., U.S. Office Action mailed Dec. 31, 2013, directed to U.S. Appl. No. 13/718,693; 8 pages.
Gammack et al. U.S. Office Action mailed Oct. 18, 2012, directed to U.S. Appl. No. 12/917,247; 11 pages.
Gammack et al., U.S. Office Action mailed Sep. 3, 2014, directed to U.S. Appl. No. 13/861,891; 7 pages.
Wallace et al., U.S. Office Action mailed Jun. 7, 2013, directed to U.S. Appl. No. 13/192,223; 30 pages.
Wallace et al., U.S. Office Action mailed Oct. 23, 2013, directed to U.S. Appl. No. 13/192,223; 18 pages.
Gammack et al., U.S. Office Action mailed Apr. 12, 2011, directed to U.S. Appl. No. 12/716,749; 8 pages.
Gammack et al., U.S. Office Action mailed Sep. 1, 2011, directed to U.S. Appl. No. 12/716,749; 9 pages.
Gammack et al., U.S. Office Action mailed Jun. 25, 2012, directed to U.S. Appl. No. 12/716,749; 11 pages.
Gammack et al., U.S. Office Action mailed May 24, 2011, directed to U.S. Appl. No. 12/716,613; 9 pages.
Fitton et al., U.S. Office Action mailed Mar. 8, 2011, directed to U.S. Appl. No. 12/716,780; 12 pages.
Fitton et al., U.S. Office Action mailed Sep. 6, 2011, directed to U.S. Appl. No. 12/716,780; 16 pages.
Staniforth et al., U.S. Office Action mailed Sep. 18, 2014, directed to U.S. Appl. No. 13/559,142; 18 pages.
Staniforth et al., U.S. Office Action mailed May 5, 2015, directed to U.S. Appl. No. 13/559,142; 18 pages.
Staniforth et al., U.S. Office Action mailed Nov. 14, 2014, directed to U.S. Appl. No. 13/559,145; 9 pages.
Staniforth et al., U.S. Office Action mailed Jun. 1, 2015, directed to U.S. Appl. No. 13/559,146; 23 pages.

\* cited by examiner

FAN ASSEMBLY

REFERENCE TO RELATED APPLICATIONS

This application is a continuation of U.S. patent application Ser. No. 13/559,145, filed Jul. 26, 2012, which claims the priority of United Kingdom Application No. 1112911.1, filed Jul. 27, 2011, United Kingdom Application No. 1203887.3, filed Mar. 6, 2012, and United Kingdom Application No. 1203888.1, filed Mar. 6, 2012, the entire contents of which are incorporated herein by reference.

FIELD OF THE INVENTION

The present invention relates to a fan assembly. In a preferred embodiment, the present invention provides a humidifying apparatus for generating a flow of moist air and a flow of air for dispersing the moist air within a domestic environment, such as a room, office or the like. The invention may also be used to disperse a hot, cool, scented or ionized air flow within an environment.

BACKGROUND OF THE INVENTION

Domestic humidifying apparatus is generally in the form of a portable appliance having a casing comprising a water tank for storing a volume of water, and a fan for creating a flow of air through an air duct of the casing. The stored water is conveyed, usually under gravity, to an atomizing device for producing water droplets from the received water. This device may be in the form of high frequency vibrating device, such as a transducer. The water droplets enter the flow of air passing through the air duct, resulting in the emission of a mist into the environment. The appliance may include a sensor for detecting the relative humidity of the air in the environment. The sensor outputs a signal indicative of the detected relative humidity to a drive circuit, which controls the transducer to maintain the relative humidity of the air in the environment around a desired level. Typically, the actuation of the transducer is stopped when the detected relative humidity is around 5% higher than the desired level, and is restarted when the detected relative humidity is around 5% lower than the desired level.

The flow rate of the air emitted from such a humidifier tends to be relatively low, for example in the range from 1 to 2 liters per second, and so the rate at which the humid air is dispersed into a room can be very low. Furthermore, as the relative humidity of the air in the local environment of the humidifier will rise relatively rapidly in comparison to that of the air in the local environment of the user, the relative humidity detected by the sensor will not, at least initially, be indicative of the relative humidity of the air local to the user. As a result, the actuation of the transducer may be stopped when the relative humidity of the air in the local environment of the user is significantly below the desired level. Due to the relatively low rate at which the humid air is dispersed into the room, it can then take some time for the detected relative humidity to fall to a level at which the actuation of the transducer is restarted. Consequently, it may take a long period of time for the relative humidity of the air in the local environment of the user to reach the desired level.

WO 2010/100462 describes humidifying apparatus which comprises a humidifier for emitting moist air into the atmosphere, and, positioned in front of the humidifier, a fan assembly which comprises a body housing a motor-driven impeller for creating an air flow, and an annular nozzle mounted on the body which comprises an interior passage receiving the air flow and an air outlet for emitting the air flow. The nozzle defines a bore through which both air from outside the nozzle and the moist air emitted from the humidifier are drawn by the air flow emitted from the mouth. The outlet of the humidifier is located at the same level as the lowermost portion of the bore of the nozzle. Through the entrainment of the moist air emitted from the humidifier within an air current generated by the fan assembly, the moist air can be rapidly conveyed away from the humidifier to a distance of up to several meters. This can enable a user located at this distance from the humidifier to experience a rapid rise in the relative humidity of the air in the local environment.

SUMMARY OF THE INVENTION

In a first aspect, the present invention provides a fan assembly comprising a nozzle having at least one first air inlet, at least one first air outlet, a first interior passage for conveying air from said at least one first air inlet to said at least one first air outlet, at least one second air inlet, at least one second air outlet, and a second interior passage for conveying air from said at least one second air inlet to said at least one second air outlet, the nozzle defining a bore about which the interior passages extend and through which air from outside the fan assembly is drawn by air emitted from the air outlets, a body on which the nozzle is mounted, the body comprising flow generating means for generating a first air flow through the first interior passage and a second air flow through the second interior passage, a first air passageway for conveying the first air flow to said at least one first air inlet, and a second air passageway for conveying the second air flow to said at least one second air inlet, the second air passageway being arranged to receive air from the first air passageway downstream from the flow generating means, and means for changing one of the temperature, humidity, composition and electrical charge of the second air flow.

In an illustrated embodiment, the fan assembly includes a humidifier for humidifying the second air flow, but the fan assembly may alternatively comprise one of a heater, a chiller, an air purifier and an ionizer for changing another parameter of the second air flow.

A difference between the fan assembly of the present invention, when used to emit a humidified air current, and the humidifying apparatus described in WO 2010/100462 is that in the present invention, the nozzle of the fan assembly is arranged to emit both the humidified second air flow and the first air flow which carries the humidified air flow into the environment. In contrast, in WO 2010/100462 the humidified air flow is emitted from an outlet of the humidifying apparatus located behind the fan assembly, and entrained within a lower part of the air flow generated by the fan assembly. The present invention can thus allow the humidified air flow to be emitted from one or more different air outlets of the nozzle. These air outlets may be positioned, for example, about the bore of the nozzle to allow the humidified air flow to be dispersed relatively evenly within the first air flow. The means for changing one of the aforementioned parameters of the second air flow is preferably located in the body of the fan assembly. By locating the components that change the humidity of the second air flow within the body, the fan assembly may have a compact appearance, a reduced number of components and therefore reduced manufacturing costs.

The body of the fan assembly comprises a first air passageway for conveying the first air flow to the first air inlet(s) of the nozzle and a second air passageway for conveying the second air flow to the second air inlet(s) of the nozzle. The means for changing the aforementioned parameter of the second air flow may therefore be located at least partially within the second air passageway.

The body may comprise an air flow inlet for admitting the first air flow into the fan assembly. The air flow inlet may comprise a single aperture, but it is preferred that the air flow inlet comprises a plurality of apertures. These apertures may be provided by a mesh, a grille or other molded component forming part of the external surface of the body.

The first air passageway preferably extends from the air flow inlet to the first air inlet(s) of the nozzle. The second air passageway is arranged to receive air from the first air passageway. An advantage of locating the junction downstream from the flow generating means is that the flow generating means may comprise a single impeller and a motor for generating an air flow which is divided into the first and second air flows downstream from the impeller. The impeller may be a mixed flow impeller or an axial impeller.

Preferably, the first air flow is emitted at a first air flow rate and the second air flow is emitted at a second air flow rate which is lower than the first air flow rate. The first air flow rate may be a variable air flow rate, and so the second air flow rate may vary with the first air flow rate.

The air passageways may be arranged within the body in any desired configuration depending on, inter alia, the location of the air flow inlet and the nature of the chosen means for changing the humidity or temperature of the second air flow. To reduce the size of the body, the first air passageway may be located adjacent the second air passageway. Each air passageway may extend vertically through the body, with the second air passageway extending vertically in front of the first air passageway.

The first air outlet(s) are preferably located behind the second air outlet(s) so that the second air flow is conveyed away from the nozzle within the first air flow. Each interior passage is preferably annular. The two interior passages of the nozzle may be defined by respective components of the nozzle, which may be connected together during assembly. Alternatively, the interior passages of the nozzle may be separated by a dividing wall or other partitioning member located between common inner and outer walls of the nozzle. As mentioned above, the first interior passage is preferably isolated from the second interior passage, but a relatively small amount of air may be bled from the first interior passage to the second interior passage to urge the second air flow through the second air outlet(s) of the nozzle.

As the flow rate of the first air flow is preferably greater than the flow rate of the second air flow, the volume of the first interior passage of the nozzle is preferably greater than the volume of the second interior passage of the nozzle.

The nozzle may comprise a single continuous first air outlet, which preferably extends about the bore of the nozzle, and is preferably centered on the axis of the bore. Alternatively, the nozzle may comprise a plurality of first air outlets which are arranged about the bore of the nozzle. For example, the first air outlets may be located on opposite sides of the bore. The first air outlet(s) are preferably arranged to emit air through at least a front part of the bore. The first air outlet(s) may be arranged to emit air over a surface defining part of the bore to maximize the volume of air which is drawn through the bore by the air emitted from the first air outlet(s). Alternatively, the first air outlet(s) may be arranged to emit the air flow from an end surface of the nozzle.

The second air outlet(s) of the nozzle may be arranged to emit the second air flow over this surface of the nozzle. Alternatively, the second air outlet(s) may be located in a front end of the nozzle, and arranged to emit air away from the surfaces of the nozzle. The first air outlet(s) may therefore be located adjacent to the second air outlet(s). The nozzle may comprise a single continuous second air outlet, which may extend about the axis of the nozzle. Alternatively, the nozzle may comprise a plurality of second air outlets, which may be arranged about the front end of the nozzle. For example, the second air outlets may be located on opposite sides of the front end of the nozzle. Each of the plurality of air outlets may comprise one or more apertures, for example, a slot, a plurality of linearly aligned slots, or a plurality of apertures. The first air outlets may extend parallel to the second air outlets.

In a preferred embodiment, the fan assembly comprises a humidifying system which is configured to increase the humidity of the second air flow before it is emitted from the nozzle. To provide the fan assembly with a compact appearance and with a reduced component number, at least part of the humidifying system may be located beneath the nozzle. At least part of the humidifying system may also be located beneath the impeller and the motor. For example, a transducer for atomizing water may be located beneath the nozzle. This transducer may be controlled by a controller that controls the motor. The second air passageway may be arranged to convey the second air flow over a reservoir for receiving water from the water tank and the transducer for atomizing water located in the reservoir.

The body may comprise a removable water tank for supplying water to the humidifying system. To provide the body with a compact appearance, the water tank preferably extends about the flow generating means. In a preferred embodiment, the water tank surrounds the flow generating means. The water tank may surround at least part of the first air passageway, and at least part of the second air passageway. The body may comprise a base comprising the air inlet through which air enters the fan assembly, and the water tank may be mounted on the base. Preferably, the base and the water tank each have a curved, for example cylindrical, outer surface, and the outer surfaces of the base and the water tank may have substantially the same radius. This can further contribute towards the compact appearance of the fan assembly.

In a second aspect, the present invention provides humidifying apparatus comprising a nozzle having at least one first air inlet, at least one first air outlet, a first interior passage for conveying air from said at least one first air inlet to said at least one first air outlet, at least one second air inlet, at least one second air outlet, and a second interior passage for conveying air from said at least one second air inlet to said at least one second air outlet, the nozzle defining a bore about which the interior passages extend and through which air from outside the fan assembly is drawn by air emitted from the air outlets, a body on which the nozzle is mounted, the body comprising flow generating means for generating a first air flow through the first interior passage and a second air flow through the second interior passage, a first air passageway for conveying the first air flow to said at least one first air inlet, a second air passageway for conveying the second air flow to said at least one second air inlet, the second air passageway being arranged to receive air from the first air passageway downstream from the flow generating means, and means for humidifying the second air flow.

In a third aspect, the present invention provides humidifying apparatus comprising a nozzle having at least one first air inlet, at least one first air outlet, a first interior passage for conveying air from said at least one first air inlet to said at least one first air outlet, at least one second air inlet, at least one second air outlet, and a second interior passage for conveying air from said at least one second air inlet to said at least one second air outlet, the nozzle defining a bore through which air from outside the fan assembly is drawn by air emitted from the air outlets, and a body on which the nozzle is mounted, the body comprising a base and a water tank mounted on the base, the base comprising flow generating means for generating a first air flow through the first interior passage and a second air flow through the second interior passage, a reservoir for receiving water from the water tank, a transducer for atomizing water located in the reservoir, a first air passageway for conveying the first air flow to said at least one first air inlet, and a second air passageway for conveying the second air flow over said reservoir and to said at least one second air inlet, and wherein the water tank preferably extends about the flow generating means. The second air passageway is preferably connected to the first air passageway downstream from the flow generating means. The flow generating means preferably comprises an impeller and a motor for driving the impeller.

The impeller is preferably in the form of a mixed flow impeller. The benefit of using a mixed flow impeller to generate the first and the second air flows is that the pressure of the air flow emitted from a rotating mixed flow impeller can be sufficiently high to allow the second air flow to overcome any flow impedences encountered, for example, as the air flow through the base is divided into the first air flow and the second air flow, and as the second air flow passes along the second air passageway to the at least one second air inlet of the nozzle.

In a fourth aspect, the present invention provides humidifying apparatus comprising a body and a nozzle mounted on the body, the body comprising an impeller, a motor for driving the impeller to generate an air flow, a first duct for conveying the air flow to humidifying means for humidifying the air flow, and a second duct for conveying the humidified air flow to the nozzle, and wherein the nozzle comprises at least one air inlet for receiving the humidified air flow and at least one air outlet for emitting the humidified air flow, the nozzle extending about an opening through which air from outside the apparatus is drawn by air emitted from the nozzle.

The impeller is preferably in the form of a mixed flow impeller. The humidifying means preferably comprises a transducer for atomizing water. This transducer may be controlled by a controller that controls the motor. The body may comprise a removable water tank for supplying water to the transducer. To provide the body with a compact appearance, the water tank preferably extends about the impeller. In a preferred embodiment, the water tank surrounds the impeller. The body may comprise a base comprising the air inlet through which air enters the humidifying apparatus, and the water tank may be mounted on the base. Preferably, the base and the water tank each have a curved, for example cylindrical, outer surface, and the outer surfaces of the base and the water tank may have substantially the same radius. The first duct is preferably located adjacent to the second duct. The first duct and the second duct are preferably arranged to convey air in substantially opposite directions. The first duct is preferably configured to convey air over a reservoir for receiving water from the water tank, and the second duct preferably has an air inlet located above the reservoir. The transducer is preferably arranged to atomize water within the reservoir.

Features described above in connection with the first aspect of the invention are equally applicable to each of the second to fourth aspects of the invention, and vice versa.

BRIEF DESCRIPTION OF THE DRAWINGS

An embodiment of the present invention will now be described, by way of example only, with reference to the accompanying drawings, in which.

DETAILED DESCRIPTION OF THE INVENTION

Figure 1:
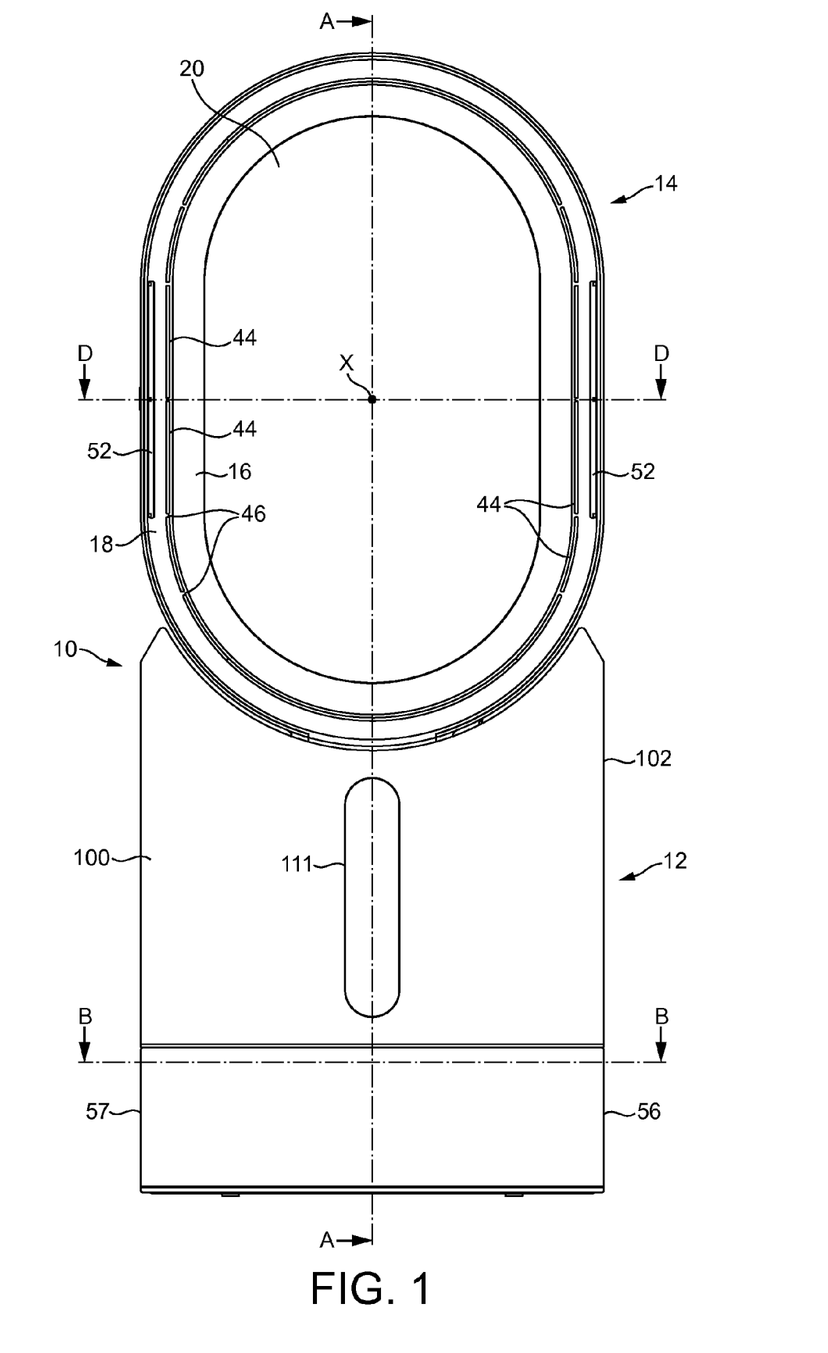
FIG. 1 is a front view of a fan assembly.
Figure 2:
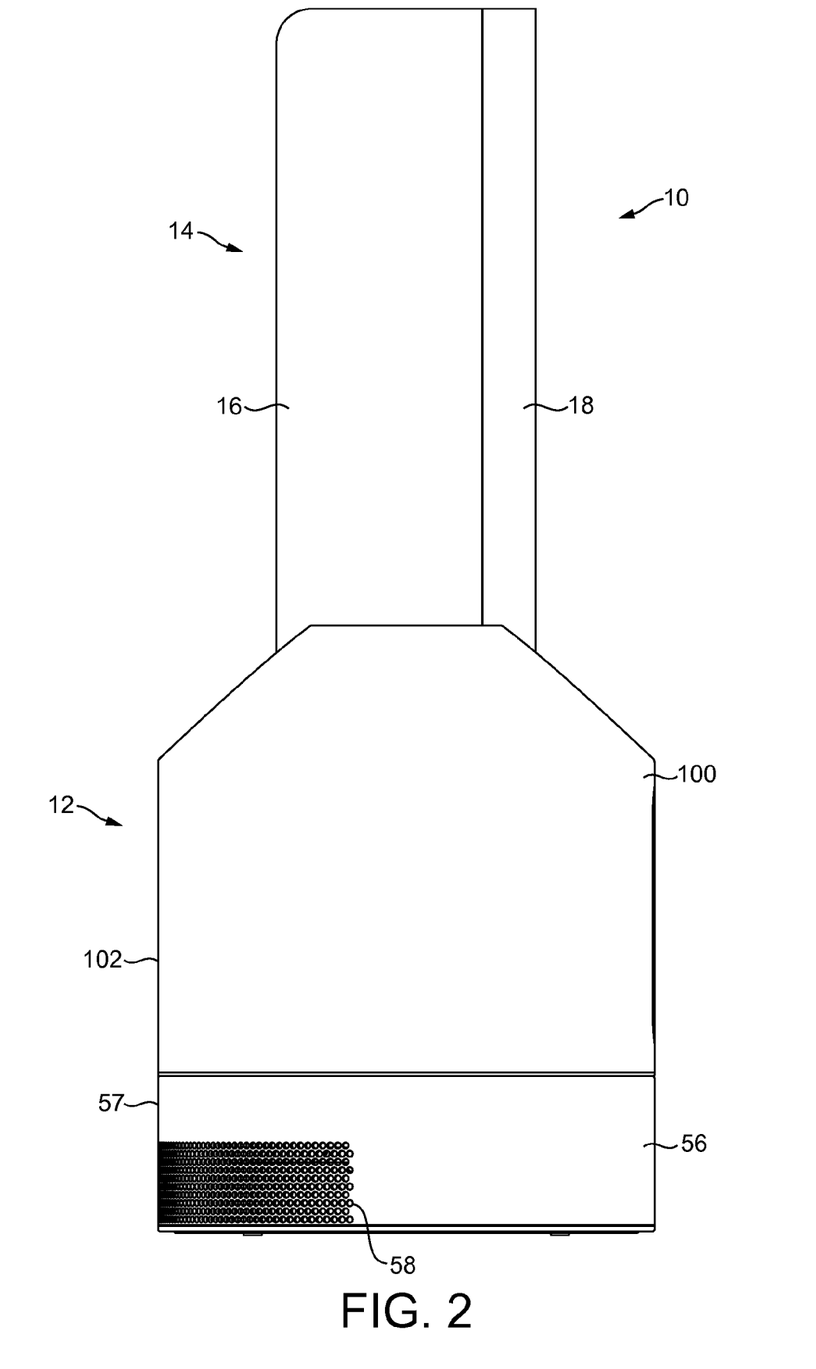
FIG. 2 is a side view of the fan assembly.
Figure 3:
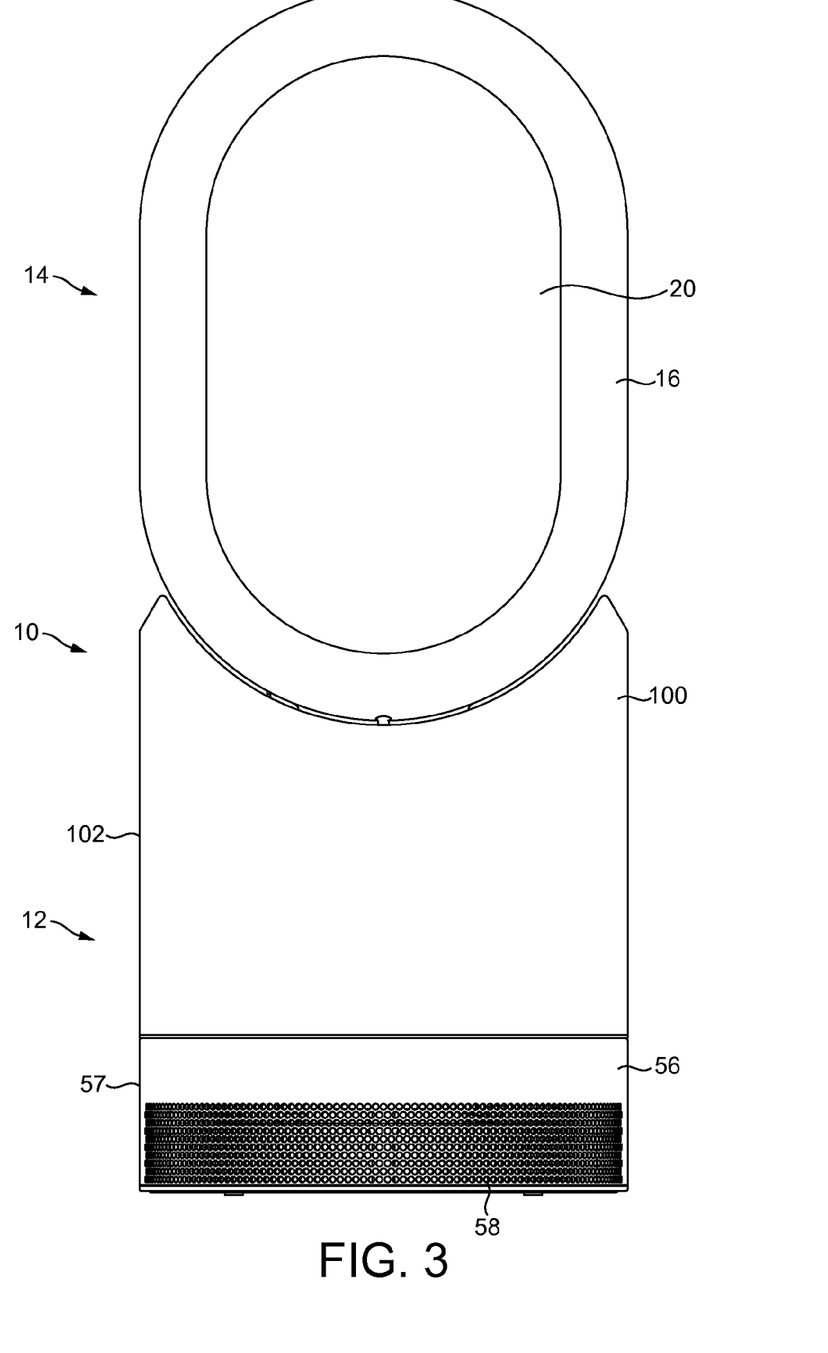
FIG. 3 is a rear view of the fan assembly.

FIGS. 1 to 3 are external views of a fan assembly 10. In overview, the fan assembly 10 comprises a body 12 comprising an air inlet through which air enters the fan assembly 10, and a nozzle 14 in the form of an annular casing mounted on the body 12, and which comprises a plurality of air outlets for emitting air from the fan assembly 10.

The nozzle 14 is arranged to emit two different air flows. The nozzle 14 comprises a rear section 16 and a front section 18 connected to the rear section 16. Each section 16, 18 is annular in shape, and extends about a bore 20 of the nozzle 14. The bore 20 extends centrally through the nozzle 14 so that the center of each section 16, 18 is located on the axis X of the bore 20.

In this example, each section 16, 18 has a "racetrack" shape, in that each section 16, 18 comprises two, generally straight sections located on opposite sides of the bore 20, a curved upper section joining the upper ends of the straight sections and a curved lower section joining the lower ends of the straight sections. However, the sections 16, 18 may have any desired shape; for example the sections 16, 18 may be circular or oval. In this embodiment, the height of the nozzle 14 is greater than the width of the nozzle, but the nozzle 14 may be configured so that the width of the nozzle 14 is greater than the height of the nozzle 14.

Each section 16, 18 of the nozzle 14 defines a flow path along which a respective one of the air flows passes. In this embodiment, the rear section 16 of the nozzle 14 defines a first air flow path along which a first air flow passes through the nozzle 14, and the front section 18 of the nozzle 14 defines a second air flow path along which a second air flow passes through the nozzle 14.

Figure 4:
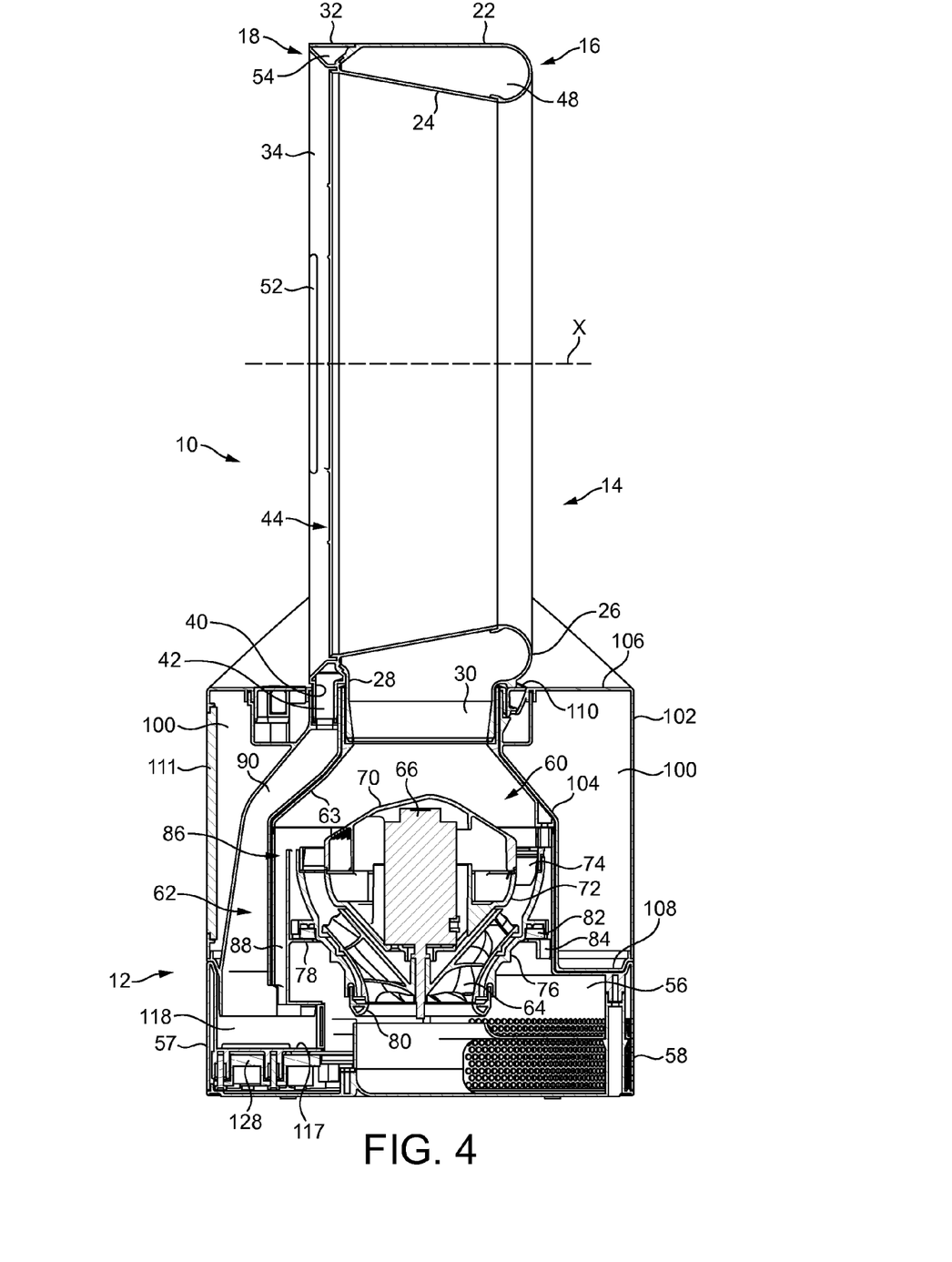
FIG. 4 is a side sectional view taken along line A-A in FIG. 1.
Figure 7:
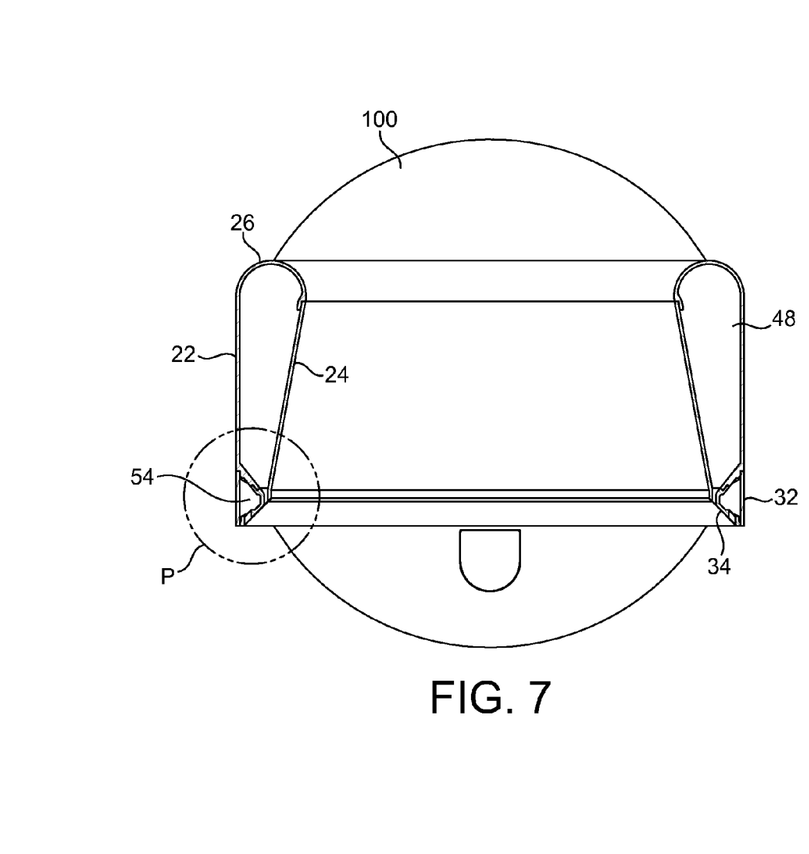
FIG. 7 is a top sectional view taken along line D-D in FIG. 1.
Figure 8:
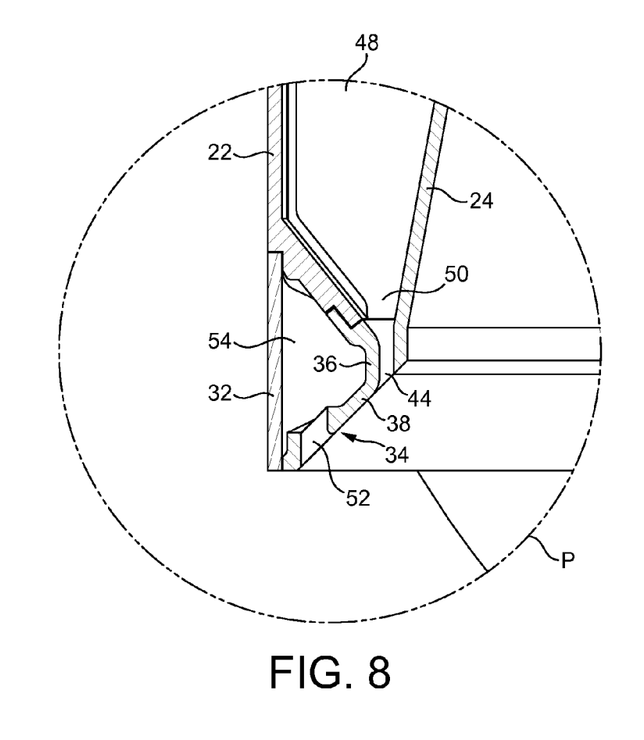
FIG. 8 is a close-up of area P indicated in FIG. 7.

With reference also to FIG. 4, the rear section 16 of the nozzle 14 comprises an annular first outer casing section 22 connected to and extending about an annular inner casing section 24. Each casing section 22, 24 extends about the bore axis X. Each casing section may be formed from a plurality of connected parts, but in this embodiment each casing section 22, 24 is formed from a respective, single molded part. With reference also to FIGS. 7 and 8, a rear portion 26 of the first outer casing section 22 is curved inwardly towards the bore axis X to define a rear end of the nozzle 14 and a rear part of the bore 20. During assembly the end of the rear portion 26 of the first outer casing section 22 is connected to the rear end of the inner casing section 24, for example using an adhesive. The first outer casing section 22 comprises a tubular base 28 which defines a first air inlet 30 of the nozzle 14.

The front section 18 of the nozzle 14 also comprises an annular second outer casing section 32 connected to and extending about an annular front casing section 34. Again, each casing section 32, 34 extends about the bore axis X, and may be formed from a plurality of connected parts, but in this embodiment each casing section 32, 34 is formed from a respective, single molded part. In this example, the front casing section 34 comprises a rear portion 36 which is connected to the front end of the outer casing section 22, and a front portion 38 which is generally frusto-conical in shape and flared outwardly from the rear portion 36 away from the bore axis X. The front casing section 34 may be integral with the inner casing section 24. The second outer casing section 32 is generally cylindrical in shape, and extends between the first outer casing section 22 and the front end of the front casing section 34. The second outer casing section 32 comprises a tubular base 40 which defines a second air inlet 42 of the nozzle 14.

The casing sections 24, 34 together define a first air outlet 44 of the nozzle 14. The first air outlet 44 is defined by overlapping, or facing, surfaces of the inner casing section 24 and the rear portion 36 of the front casing section 34 so that the first air outlet 44 is arranged to emit air from a front end of the nozzle 14. The first air outlet 44 is in the form of an annular slot, which has a relatively constant width in the range from 0.5 to 5 mm about the bore axis X. In this example the first air outlet 44 has a width of around 1 mm. Where the inner casing sections 24, 34 are formed from respective components, spacers 46 may be spaced about the first air outlet 44 for urging apart the overlapping portions of the casing sections 24, 34 to control the width of the first air outlet 44. These spacers may be integral with either of the casing sections 24, 34. Where the casing sections 24, 34 are formed from a single component, the spacers 46 are replaced by fins which are spaced about the first air outlet 44 for connecting together the inner casing section 24 and the front casing section 34.

The nozzle 14 defines an annular first interior passage 48 for conveying the first air flow from the first air inlet 30 to the first air outlet 44. The first interior passage 48 is defined by the internal surface of the first outer casing section 22 and the internal surface of the inner casing section 24. A tapering, annular mouth 50 guides the first air flow to the first air outlet 44. A first air flow path through the nozzle 14 may therefore be considered to be formed from the first air inlet 30, the first interior passage 48, the mouth 50 and the first air outlet 40.

The front casing section 34 defines a plurality of second air outlets 52 of the nozzle 14. The second air outlets 52 are also formed in the front end of the nozzle 14, each on a respective side of the bore 20, for example by molding or machining. Each of the second air outlets 52 is located downstream from the first air outlet 44. In this example, each second air outlet 52 is in the form of a slot having a relatively constant width in the range from 0.5 to 5 mm. In this example each second air outlet 52 has a width of around 1 mm. Alternatively, each second air outlet 52 may be in the form of a row of circular apertures or slots formed in the front casing section 34 of the nozzle 14.

The nozzle 14 defines an annular second interior passage 54 for conveying the second air flow from the second air inlet 42 to the second air outlets 52. The second interior passage 54 is defined by the internal surfaces of the casing sections 32, 34, and by the front part of the external surface of the first outer casing section 22. The second interior passage 54 is isolated within the nozzle 14 from the first interior passage 48. A second air flow path through the nozzle 14 may therefore be considered to be formed by the second air inlet 42, the second interior passage 54 and the second air outlets 52.

The body 12 is generally cylindrical in shape. The body 12 comprises a base 56 upon which the nozzle 14 is mounted. The base 56 has an external outer wall 57 which is cylindrical in shape, and which comprises an air inlet 58. In this example, the air inlet 58 comprises a plurality of apertures formed in the outer wall 57 of the base 56. The base 56 comprises a first air passageway 60 for conveying a first air flow to the first air flow path through the nozzle 14, and a second air passageway 62 for conveying a second air flow to the second air flow path through the nozzle 14.

A front portion of the base 56 may comprise a user interface of the fan assembly 10. The user interface is illustrated schematically in FIG. 9, and described in more detail below. A mains power cable (not shown) for supplying electrical power to the fan assembly 10 extends through an aperture formed in the base 56.

The first air passageway 60 passes through the base 56 from the air inlet 58 to the first air inlet 30 of the nozzle 14. The first air passageway 60 is generally defined by a tubular upper wall 63 of the base 56. The tubular base 28 of the nozzle 14 is inserted into the open upper end of the upper wall 63. The upper wall 63 extends about an impeller 64 for generating a first air flow through the first air passageway 60. In this example the impeller 64 is in the form of a mixed flow impeller. The impeller 64 is connected to a rotary shaft extending outwardly from a motor 66 for driving the impeller 64. In this embodiment, the motor 66 is a DC brushless motor having a speed which is variable by a drive circuit 68 in response to a speed selection by a user. The maximum speed of the motor 66 is preferably in the range from 5,000 to 10,000 rpm. The motor 66 is housed within a motor bucket comprising an upper portion 70 connected to a lower portion 72. The upper portion 70 of the motor bucket comprises a diffuser 74 in the form of a stationary disc having curved blades. The diffuser 74 is located beneath the first air inlet 30 of the nozzle 14.

The motor bucket is located within, and mounted on, a generally frusto-conical impeller housing 76. The impeller housing 76 is, in turn, mounted on an annular support 78 extending inwardly from the upper wall 63. An annular inlet member 80 is connected to the bottom of the impeller housing 76 for guiding the air flow into the impeller housing 76. An annular sealing member 82 is located between the impeller housing 76 and the annular support 78 to prevent air from passing around the outer surface of the impeller housing 76 to the inlet member 80. The annular support 78 preferably comprises a guide portion 84 for guiding an electrical cable from the drive circuit 68 to the motor 66.

Figure 5:
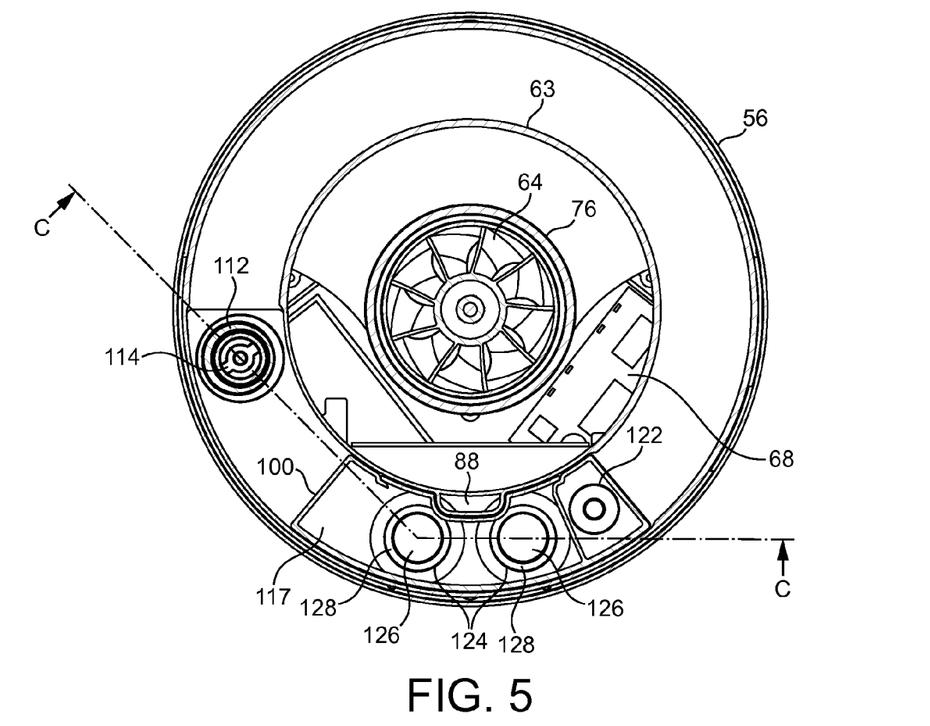
FIG. 5 is a top sectional view taken along line B-B in FIG. 1.
Figure 6:
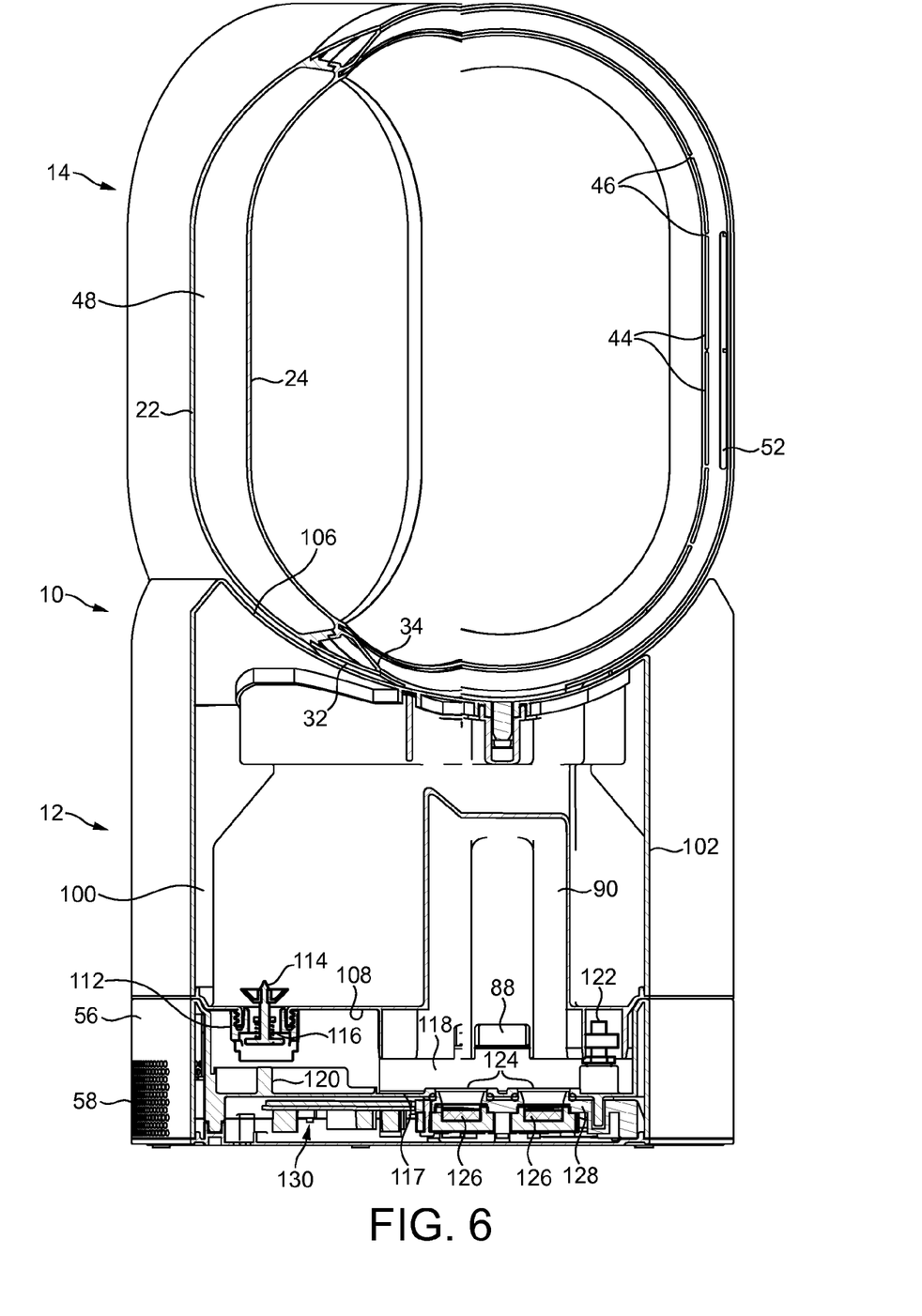
FIG. 6 is a sectional view take along line C-C in FIG. 5.

The second air passageway 62 is arranged to receive air from the first air passageway 60. The second air passageway 62 is located adjacent to the first air passageway 60. The second air passageway 62 comprises an inlet port 86 located downstream from the diffuser 74 for receiving part of the air flow emitted from the diffuser 74. The second air passageway 62 is defined by an inlet duct 88 which is arranged to receive the second air flow from the inlet port 86. With reference to FIGS. 5 and 6, the inlet duct 88 is defined by the upper wall 63 and is located adjacent to, and in this example in front of, part of the first air passageway 60. The second air passageway 62 is further defined by an outlet duct 90 which is arranged to receive the second air flow from the inlet duct 88, and to convey the air flow to the second air inlet 42 of the nozzle 14. The second air flow is conveyed through the inlet duct 88 and the outlet duct 90 in generally opposite directions. The base 40 of the second outer casing section 32 of the nozzle 14 is inserted into the open upper end of the outlet duct 90.

In this example, the fan assembly 10 comprises humidifying means or a humidifying system for increasing the humidity of the second air flow before it enters the nozzle 14, and which is housed within the body 12 of the fan assembly 10. This example of a fan assembly 10 may thus be considered to provide humidifying apparatus. With reference to FIGS. 4 to 6, the humidifying means comprises a water tank 100 removably mountable on the base 56 of the body 12. The water tank 100 has a cylindrical outer wall 102 which has the same radius as the external outer wall 57 of the base 56 of the body 12 so that the body 12 has a cylindrical appearance when the water tank 100 is mounted on the base 56. The water tank 100 has an annular inner wall 104 which has the same shape as, and surrounds, the upper wall 63 of the base 56. The outer wall 102 and the inner wall 104 define, with the upper wall 106 and the lower wall 108 of the water tank 100, an annular volume for storing water. The water tank 100 thus surrounds the impeller 64 and the motor 66, and so at least part of the first air passageway 60, and at least part of the second air passageway 62.

The water tank 100 preferably has a capacity in the range from 2 to 4 liters. The upper wall 106 of the water tank 100 is shaped to define a handle 110 to enable a user to lift the water tank 100 from the base 56 using one hand. A window 111 is provided on the outer wall 102 of the water tank 100 to allow a user to see the level of water within the water tank 100 when it is disposed on the base station 56.

A spout 112 is removably connected to the lower wall 108 of the water tank 100, for example through co-operating threaded connections. In this example the water tank 100 is filled by removing the water tank 100 from the base 56 and inverting the water tank 100 so that the spout 112 is projecting upwardly. The spout 112 is then unscrewed from the water tank 100 and water is introduced into the water tank 100 through an aperture exposed when the spout 112 is disconnected from the water tank 100. Once the water tank 100 has been filled, the user reconnects the spout 112 to the water tank 100, re-inverts the water tank 100 and replaces the water tank 100 on the base 56. A spring-loaded valve 114 is located within the spout 112 for preventing leakage of water through a water outlet 116 of the spout 112 when the water tank 100 is re-inverted. The valve 114 is biased towards a position in which a skirt of the valve 114 engages the upper surface of the spout 112 to prevent water entering the spout 112 from the water tank 100.

The base 56 comprises an inner wall 117 which defines a water reservoir 118 for receiving water from the water tank 100. In this example, the water reservoir 118 has a capacity of 200 ml. An upwardly extending pin 120 of the base 56 protrudes into the spout 112 when the water tank 100 is located on the base 56. The pin 120 pushes the valve 114 upwardly to open the spout 112, thereby allowing water to pass under gravity into the water reservoir 118 from the water tank 100. This results in the water reservoir 118 becoming filled with water to a level which is substantially co-planar with the upper surface of the pin 120. A magnetic level sensor 122 is located within the water reservoir 118 for detecting the level of water within the water reservoir 118.

The inner wall 117 of the base 56 comprises apertures 124 each for exposing the surface of a respective piezoelectric transducer 126 for atomising water stored in the water reservoir 118. A metallic heat sink 128 is located between the inner wall 117 and the transducers 126 for conveying heat away from the transducers 126. Part of the heat sink 128 may be located adjacent a second set of apertures formed in the outer surface of the base 56 of the body 12 so that heat can be conveyed from the heat sink 128 through those apertures. Annular sealing members form water-tight seals between the transducers 126 and the heat sink 128. The drive circuit 68 actuates ultrasonic vibration of the transducers 126 to atomize water within the water reservoir 118.

The open bottom ends of the inlet duct 88 and the outlet duct 90 are each located above the maximum level of water within the water reservoir 118 so that the second air flow passes between these ducts 88, 90 over the surface of the water located in the water reservoir 118. The outlet duct 90 is defined by the water tank 100.

Figure 9:
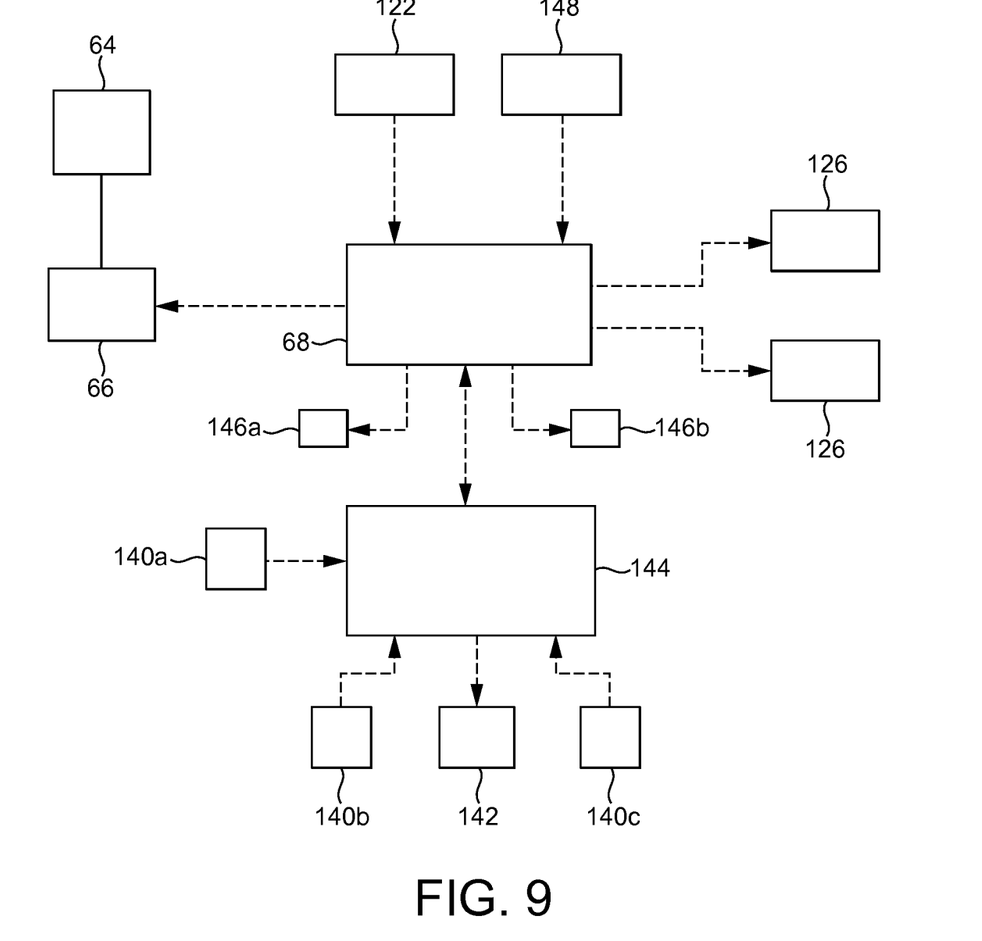
FIG. 9 is a schematic illustration of a control system of the fan assembly.

A user interface for controlling the operation of the fan assembly is located on the side wall of the casing section of the body 12. FIG. 9 illustrates schematically a control system for the fan assembly 10, which includes this user interface and other electrical components of the fan assembly 10. In this example, the user interface comprises a plurality of user-operable buttons 140a, 140b and 140c, and a display 142. The first button 140a is used to activate and deactivate the motor 66, and the second button 140b is used to set the speed of the motor 66, and thus the rotational speed of the impeller 64. The third button 140c is used to set a desired level for the relative humidity of the environment in which the fan assembly 10 is located, such as a room, office or other domestic environment. For example, the desired relative humidity level may be selected within a range from 30 to 80% at 20° C. through repeated actuation of the third button 140c. The display 142 provides an indication of the currently selected relative humidity level.

The user interface further comprises a user interface circuit 144 which outputs control signals to the drive circuit 68 upon actuation of one of the buttons, and which receives control signals output by the drive circuit 68. The user interface may also comprise one or more LEDs for providing a visual alert depending on a status of the humidifying apparatus. For example, a first LED 146a may be illuminated by the drive circuit 68 indicating that the water tank 100 has become depleted, as indicated by a signal received by the drive circuit 68 from the level sensor 122.

A humidity sensor 148 is also provided for detecting the relative humidity of air in the external environment, and for supplying a signal indicative of the detected relative humidity to the drive circuit 68. In this example the humidity sensor 148 may be located immediately behind the air inlet 58 to detect the relative humidity of the air flow drawn into the fan assembly 10. The user interface may comprise a second LED 146b which is illuminated by the drive circuit 68 when an output from the humidity sensor 148 indicates that the relative humidity of the air flow entering the fan assembly 10 is at or above the desired relative humidity level set by the user.

To operate the fan assembly 10, the user actuates the first button 140a, in response to which the drive circuit 68 activates the motor 66 to rotate the impeller 64. The rotation of the impeller 64 causes air to be drawn into the body 12 through the air inlet 58. An air flow passes through the impeller housing 76 and the diffuser 74. Downstream from the diffuser 74, a portion of the air emitted from the diffuser 74 enters the inlet duct 88 through the inlet port 86, whereas the remainder of the air emitted from the diffuser 74 is conveyed by the upper wall 63 to the first air inlet 30 of the nozzle 14. The impeller 64 and the motor 66 may thus be considered to generate a first air flow which is conveyed to the nozzle 14 by the first air passageway 70 and which enters the nozzle 14 through the first air inlet 30.

The first air flow enters the first interior passage 48 at the base of the rear section 16 of the nozzle 14. At the base of the first interior passage 48, the air flow is divided into two air streams which pass in opposite directions around the bore 20 of the nozzle 14. As the air streams pass through the first interior passage 48, air enters the mouth 50 of the nozzle 14. The air flow into the mouth 50 is preferably substantially even about the bore 20 of the nozzle 14. The mouth 50 guides the air flow towards the first air outlet 44 of the nozzle 14, from where it is emitted from the fan assembly 10.

The air flow emitted from the first air outlet 40 causes a secondary air flow to be generated by the entrainment of air from the external environment, specifically from the region around the first air outlet 44 and from around the rear of the nozzle 14. Some of this secondary air flow passes through the bore 20 of the nozzle 14, whereas the remainder of the secondary air flow becomes entrained within the air flow emitted from the first air outlet in front of the nozzle 14.

As mentioned above, with rotation of the impeller 64 air enters the second air passageway 72 through the inlet port 86 of the inlet duct 88. Simultaneous with the actuation of the motor 66, the drive circuit 68 actuates the vibration of the transducers 126, preferably at a frequency f1 in the range from 1 to 2 MHz, to atomize water present within the water reservoir 118. This creates airborne water droplets above the water located within the water reservoir 118. As water within the water reservoir 118 is atomized, the water reservoir 118 is constantly replenished with water from the water tank 100, so that the level of water within the water reservoir 118 remains substantially constant while the level of water within the water tank 100 gradually falls.

With rotation of the impeller 66, a second air flow passes through the inlet duct 88 and is emitted directly over the water located in the water reservoir 118, causing airborne water droplets to become entrained within the second air flow. The—now moist—second air flow passes upwardly through the outlet duct 90 of the second air passageway 62 to the second air inlet 42 of the nozzle 14, and enters the second interior passage 54 within the front section 18 of the nozzle 14.

At the base of the second interior passage 54, the second air flow is divided into two air streams which pass in opposite directions around the bore 20 of the nozzle 14. As the air streams pass through the second interior passage 54, each air stream is emitted from a respective one of the second air outlets 52 located in the front end of the nozzle 14 in front of the first air outlet 44. The emitted second air flow is conveyed away from the fan assembly 10 within the air flow generated through the emission of the first air flow from the nozzle 14, thereby enabling a humid air current to be experienced rapidly at a distance of several meters from the fan assembly 10.

The moist air flow is emitted from the nozzle 14 until the relative humidity of the air flow entering the fan assembly 10, as detected by the humidity sensor 148, is 1% at 20° C. higher than the relative humidity level selected by the user using the third button 140*c*. The emission of the humidified air flow from the nozzle 14 may then be terminated by the drive circuit 68, preferably by reducing the frequency of the vibration of the transducers 126 to a frequency f2, where f1>f2≥0. Optionally, the motor 66 may also be stopped so that no air flow is emitted from the nozzle 14. However, when the humidity sensor 148 is located in close proximity to the motor 66 it is preferred that the motor 66 is operated continually to avoid undesirable temperature fluctuation in the local environment of the humidity sensor 148.

As a result of the termination of the emission of a moist air flow from the fan assembly 10, the relative humidity detected by the humidity sensor 148 will begin to fall. Once the relative humidity of the air of the environment local to the humidity sensor 148 has fallen to 1% at 20° C. below the relative humidity level selected by the user, the drive circuit 68 re-activates the vibration of the transducers 126 at frequency f1. If the motor 66 has been stopped, the drive circuit 68 simultaneously re-activates the motor 66. As before, the moist air flow is emitted from the nozzle 14 until the relative humidity detected by the humidity sensor 170 is 1% at 20° C. higher than the relative humidity level selected by the user.

This actuation sequence of the transducers 126 (and optionally the motor 66) for maintaining the detected humidity level around the level selected by the user continues until button 140*a* is actuated again, or until a signal is received from the level sensor 122 indicating that the level of water within the water reservoir 118 has fallen below the minimum level. If the button 140*a* is actuated, the drive circuit 68 deactivates the motor 66 and the transducers 126 to switch off the fan assembly 10.

The invention claimed is:

1. A humidifying apparatus comprising:

a nozzle having at least one first air inlet, at least one first air outlet, a first interior passage for conveying air from said at least one first air inlet to said at least one first air outlet, at least one second air inlet, at least one second air outlet, and a second interior passage for conveying air from said at least one second air inlet to said at least one second air outlet, the nozzle defining a bore through which air from outside the humidifying apparatus is drawn by air emitted from the air outlets; and a body on which the nozzle is mounted, the body comprising a base and a water tank mounted on the base, the base comprising a flow generating system for generating a first air flow through the first interior passage and a second air flow through the second interior passage, a reservoir for receiving water from the water tank, a transducer for atomizing water located in the reservoir, a first air passageway for conveying the first air flow to said at least one first air inlet, and a second air passageway for conveying the second air flow over said reservoir and to said at least one second air inlet.

2. The humidifying apparatus of claim 1, wherein the first interior passage is isolated from the second interior passage.

3. The humidifying apparatus of claim 1, wherein the first interior passage surrounds the bore of the nozzle.

4. The humidifying apparatus of claim 1, wherein the second interior passage surrounds the bore of the nozzle.

5. The humidifying apparatus of claim 1, wherein said at least one first air outlet comprises a plurality of first air outlets located about the bore.

6. The humidifying apparatus of claim 1, wherein said at least one second air outlet comprises a plurality of air outlets located about the bore.

7. The humidifying apparatus of claim 1, wherein the base and the water tank each have a cylindrical outer surface, and wherein the outer surfaces of the base and the water tank have substantially the same radius.

* * * * *